(12) United States Patent
Huang (10) Patent No.: US 7,219,940 B2
(45) Date of Patent: May 22, 2007

(54) AUTOMOBILE INTERIOR REMOVABLE INSTALLATION FRAME

(76) Inventor: Pei-Hsiu Huang, 4/Fl., No. 12-1, Alley 15, Lane 214, Chung-Hsien Rd., Sec. 4, Sanchung City, Taipei Hsien (TW)

( * ) Notice: Subject to any disclaimer, the term of this patent is extended or adjusted under 35 U.S.C. 154(b) by 120 days.

(21) Appl. No.: 11/075,934

(22) Filed: Mar. 10, 2005

(65) Prior Publication Data

US 2006/0006205 A1  Jan. 12, 2006

(30) Foreign Application Priority Data

Jul. 8, 2004  (TW) ............................... 93210785 U (51) Int. Cl.
*B60N 3/12* (2006.01)

(52) U.S. Cl. ................. 296/37.12; 296/37.1; 296/37.5; 296/37.8; 248/121; 248/127

(58) Field of Classification Search .............. 296/37.5, 296/37.8, 37.9, 37.12, 37.1, 1.07; 248/682, 248/121, 127; 224/545, 547, 548, 549, 552, 224/553

See application file for complete search history.

(56) References Cited

U.S. PATENT DOCUMENTS 6,349,913 B1 * 2/2002 Jankowski ............... 248/311.2
6,929,304 B1 * 8/2005 Dry et al. .................. 296/37.8

* cited by examiner

*Primary Examiner*—Lori L. Lyjak (57) ABSTRACT

A removable installation frame comprises a mounting base having a rectangular tunnel and an opening contiguous to the tunnel. An accessory platform has two projecting tabs, a horizontally oriented hole disposed through each of the two projecting tabs, a nut in the outer side of the hole in one projecting tab and a receiving pit respectively formed along the inner and outer side of the hole in the other projecting tab. A tang includes a transverse rod tube, planar ratchets disposed at one end of the rod tube, an opening and an elastic element having a pawl at the terminus of its two surfaces. A locating ring is a washer-type annular body having lateral ratchets that correspond to the planar ratchets of the rod tube and a lock ring is a liner tube-like annular body. A fixing bolt is a threaded rod having a wing nut at one extremity.

7 Claims, 7 Drawing Sheets

AUTOMOBILE INTERIOR REMOVABLE INSTALLATION FRAME

BACKGROUND OF THE INVENTION

1) Field of the Invention

The invention herein relates to an automobile interior removable installation frame that provides for installation at a suitable place in the interior of any model automobile on vertical surfaces, horizontal surfaces, and small inwardly or outwardly inclined flat surfaces and is utilized for the mounting of accessories frequently utilized in automobiles such as beverage holders, ashtrays, scenting agents, LCD screens, and so on, with the mounted accessory removable for storage or carrying outside the automobile.

2) Description of the Prior Art

Beverage holders, ashtrays, scenting agents, LCD screens, and other similar accessories have long been installed and utilized in automobiles. However, since the design of the purpose-built installation frames for them must be of different shapes, dimensions, and arrangements based on different model automobiles to provide for installation at two specific places in certain automobiles, installation and usage is not very convenient, and especially inconvenient because they cannot be dismantled after installation to facilitate removal for storage or carrying outside the automobile.

In recent years, although manufacturers have introduced automobile interior accessory installation frames, they are limited to one or two models of automobiles and at two specific places such that frequently used automobile interior accessories can only be accommodated in one or two kinds of automobiles because there is no standard installation for the many types of accessories frequently used in automobiles and, at stated, they cannot be removed for storage or carried outside the automobile and thus installation and usage is quite inconvenient.

SUMMARY OF THE INVENTION

To solve the installation and utilization problems of typical prior art and contemporary automobile interior accessory installation frames, the invention herein features an automobile interior accessory installation frame that is designed to be installed as desired at suitable places in the interior of various automobiles on vertical surfaces, horizontal surfaces, and small inwardly or outwardly inclined flat surfaces and utilized for the mounting of accessories frequently utilized in automobiles such as beverage holders, ashtrays, scenting agents, LCD screens, and many other automobile interior items, and the mounted accessory is conveniently removable for storage or carrying outside the automobile. The present invention is comprised of a mounting base, an accessory platform, a tang, a locating ring, a lock ring, and a fixing bolt, wherein:

The mounting base consists of a rectangular block having a flat surface along one side, with the block having a minimum of two or more horizontally oriented holes into which screws are inserted for fastening and installation to a suitable place in the interior of an automobile; the flat surface has a shallow recess with a square area of approximately 80 to 90 percent that of the flat surface such that when the fastening and installation by means of screws is not possible, the shallow recess accommodates the placement of a double-sided adhesive plate that directly enables fastening and installation by means of adhesion at a suitable place in the interior of an automobile; along the lateral extent of the block, a rectangular tunnel penetrates the inner portion of the block and an opening contiguous to the tunnel is disposed in the lateral extent of the flat surface that provides for the insertion of the tang as well as facilitates its removal and detachment.

The accessory platform is a rectangular planar body having two projecting tabs extending downward from one lateral edge which constitutes the platform body; the upper lateral plane of the planar body consists of a flat surface and, furthermore, a minimum of two or more passages or holes disposed in the planar body to admit screws for fastening and installing frequently utilized automobile interior accessories onto the planar body, and the planar body flat surface has a shallow recess with a square area of approximately 80 to 90 percent that of the flat surface such that when the fastening and installation of the frequently utilized automobile interior accessories by means of screws is not possible, the shallow recess accommodates the placement of a double-sided adhesive plate that directly enables the fastening and installation of the frequently utilized automobile interior accessories by means of adhesion onto the planar body; the two projecting tabs each consist of a common axial center, horizontally oriented hole respectively disposed through them and, furthermore, a nut is embedded in the outer side of the hole in one projecting tab and a receiving pit is respectively formed along the inner and outer side of the hole in the other projecting tab, and minimum of two or more curved, horizontally oriented slots are formed on a plate between the two receiving pits that enable the respective placement of the locating ring and the lock ring at the two receiving pits.

The tang consists of a transverse rod tube, a rectangular plate, the planar body of which extends from its lower end, and planar ratchets are disposed at one end of the rod tube that enmesh with the locating ring; an opening is centrally disposed in the rectangular plate and, furthermore, an elastic element having a pawl at the terminus of its two surfaces and which is contiguous to the upper edge of the opening extends over the middle of the opening with the lower end suspended such that when the rectangular plate is inserted into the rectangular tunnel of the mounting base block, the pawl on one surface of the elastic element engages the opening of the block and is secured into position.

The locating ring is of a washer-type annular body having lateral ratchets disposed on one surface that correspond to the planar ratchets at end of the tang rod tube, thereby enabling enmeshment with it; curved projecting elements emerge from the other surface which correspond to the horizontally oriented slots on the plate between the two receiving pits, and the length of the curved projecting elements is at minimum 0.5 mm or more longer than the thickness of the plate between the two receiving pits, thereby enabling the curved projecting element to reach and extend into the outer side of the receiving pit.

The lock ring is a liner tube-like annular body of molded plastic construction or lathed construction that is nested in the receiving pit at the outer side of the other accessory platform projecting tab such that it is against the curved projecting element of the locating ring and capable of pushing and thereby shifting the lock ring inward, and causing the lateral ratchets on it to firmly and stably enmesh the planaer ratchets on the tang rod tube.

The fixing bolt is a threaded rod having a wing nut at one extremity that is fastened between the two projecting tabs of the accessory platform and utilized to secure the tang, the locating ring, and the lock ring to the accessory platform and thereby conjoin them into single structural entity.

The locating ring and lock ring are first respectively nested in the receiving pits at the inner and outer side of the other projecting tab of the accessory platform, following which the tang rod tube is placed between the two projecting tabs, the fixing bolt is then sequentially inserted through the lock ring, locating ring, and the tang rod tube from the outer side of the other projecting tab and fastened into the nut on the outer side of the accessory platform projecting tab to secure the tang between the two projecting tabs of the accessory platform, and finally the tang rectangular plate is inserted into the mounting base rectangular tunnel, enabling the pawl of the elastic element on the rectangular plate to engage and become positioned in the opening on the lateral surface of the mounting base, thereby completing the assembly of the automobile interior removable installation frame of the invention herein.

The mounting base is installed by means of screws or the double-sided adhesive plate onto a vertical surface, a horizontal surface, or on a small inwardly inclined flat surface or a small outwardly inclined surface at a suitable place in the interior of an automobile; next, comes the attachment of the frequently utilized accessory such as a beverage holder, an ashtray, a scenting agent, LCD screen, or other accessory which is screw fastened and adhesively bonded to the accessory platform planar body; and following the attachment, the tang on the accessory platform is inserted into the rectangular tunnel on the and therein positioned to complete the installation, the installation tasks of which are quite simple and rapid; it is only necessary to manually loosen the fixing bolt to simply and rapidly adjust the forward or rearward angle of the installed beverage holder, ashtray, or other frequently utilized automobile interior accessory. When the automobile is not used and the occupants have gotten off, the owner or user can detach the accessory platform and tang along with the installed frequently utilized automobile interior accessory for removal and storage or carrying outside the automobile to prevent theft of articles left inside the vehicle.

In addition to the foregoing approach to the assembly of the automobile interior removable installation frame of the invention herein, wherein the mounting base is positioned and installed at a suitable place in the interior of an automobile, and after the frequently utilized vehicle interior accessory is positioned and installed on the surface of the accessory platform rectangular planar body or circular planar body, the tang on it is inserted into the mounting base, the present invention can be modified such that the accessory platform planar body is screw fastened or adhesively bonded in the automobile interior and after changing the positioning and installation of the frequently utilized automobile interior accessory on the mounting base, then the tang on the accessory platform is integrated with the mounting base, thereby completing the assemblage. If the owner leaves the vehicle the frequently utilized automobile interior accessory attached to the mounting base is detachable from the accessory platform for removal and storage or carrying outside the automobile.

The shape of the accessory platform of the automobile interior removable installation frame of the invention herein matches the external shape of the installed accessory. When screw fastening or adhesively bonding and thereby installing a round or oval, polygonal, or other geometrically circular ashtray, the accessory platform is a circular planar body or an oval, polygonal, or other geometrically rounded planar body, whose lower side has downward extending two projecting tabs constituting the base entity that enables the positioning and installation of the round, oval, polygonal, or geometrically rounded ashtray or other automobile interior frequently utilized accessory and, furthermore, there is a harmonious overall appearance after installing the ashtray or other frequently utilized automobile interior accessory on the automobile interior removable installation frame of the invention herein; additionally, the installation, positioning, and adjustment method of other sections constituting the arrangement is totally the same as the embodiments and thus no further elaboration is provided. At the same time, during production, the accessory platform circular planar body or the oval, polygonal, or other geometrically rounded planar body is molded as a single structural entity to save much of the molding and fitting costs.

DETAILED DESCRIPTION OF THE PREFERRED EMBODIMENTS

Figure 1:
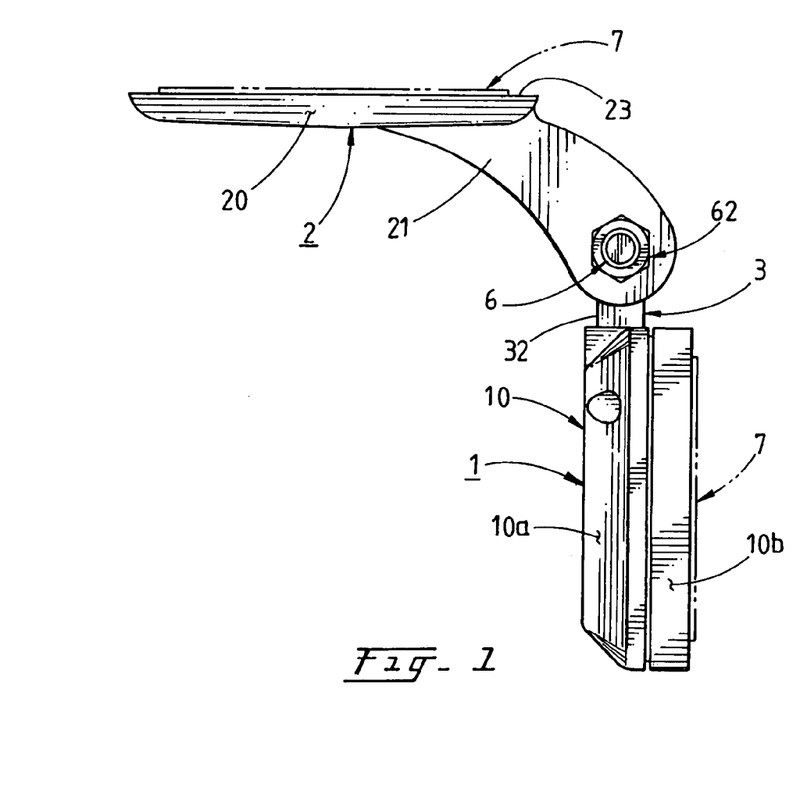
FIG. 1 is an orthographic drawing of the automobile interior removable installation frame of the invention herein, as viewed from the right lateral surface.
Figure 2:
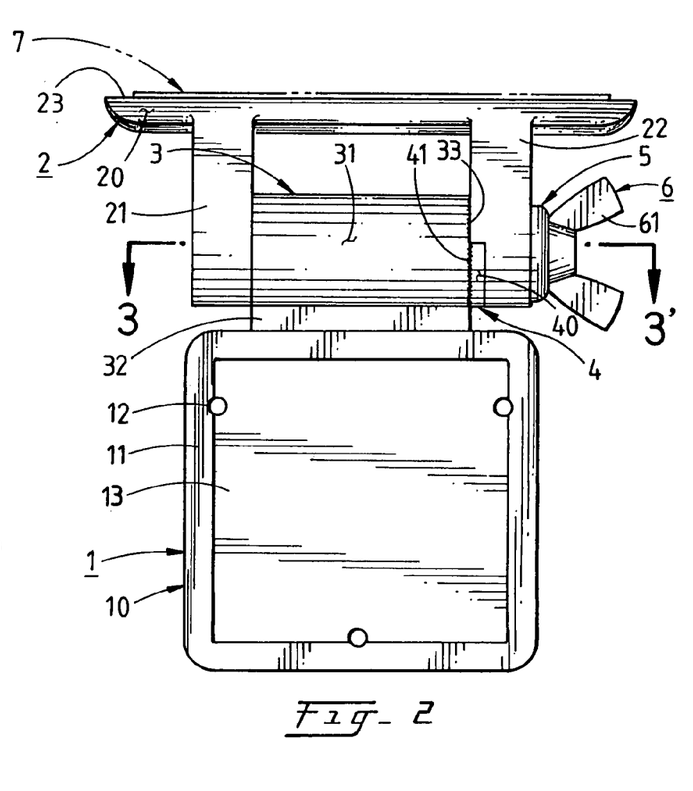
FIG. 2 is an orthographic drawing of the automobile interior removable installation frame of the invention herein, as viewed from the back surface.
Figure 3:
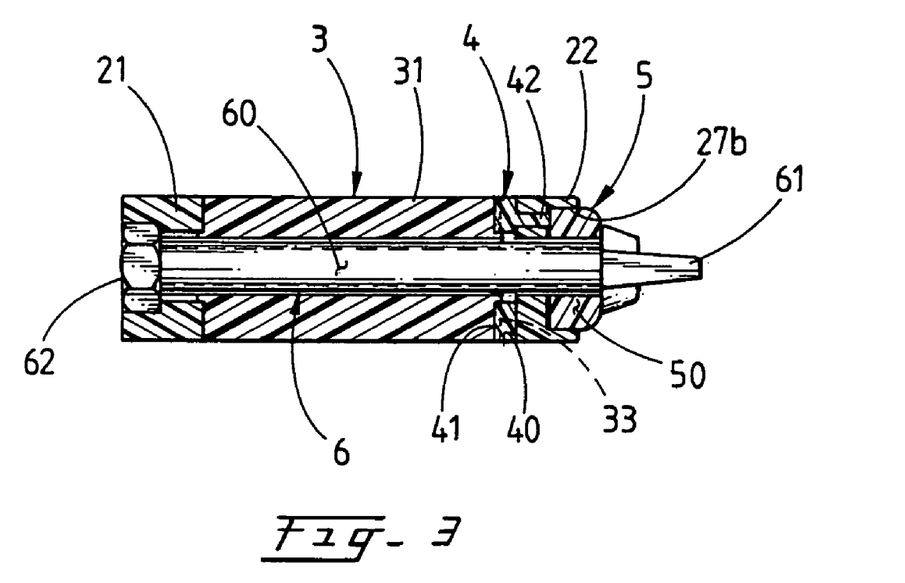
FIG. 3 is a cross-sectional drawing of FIG. 2, as viewed from the perspective of line 3–3'.
Figures 4, 5:
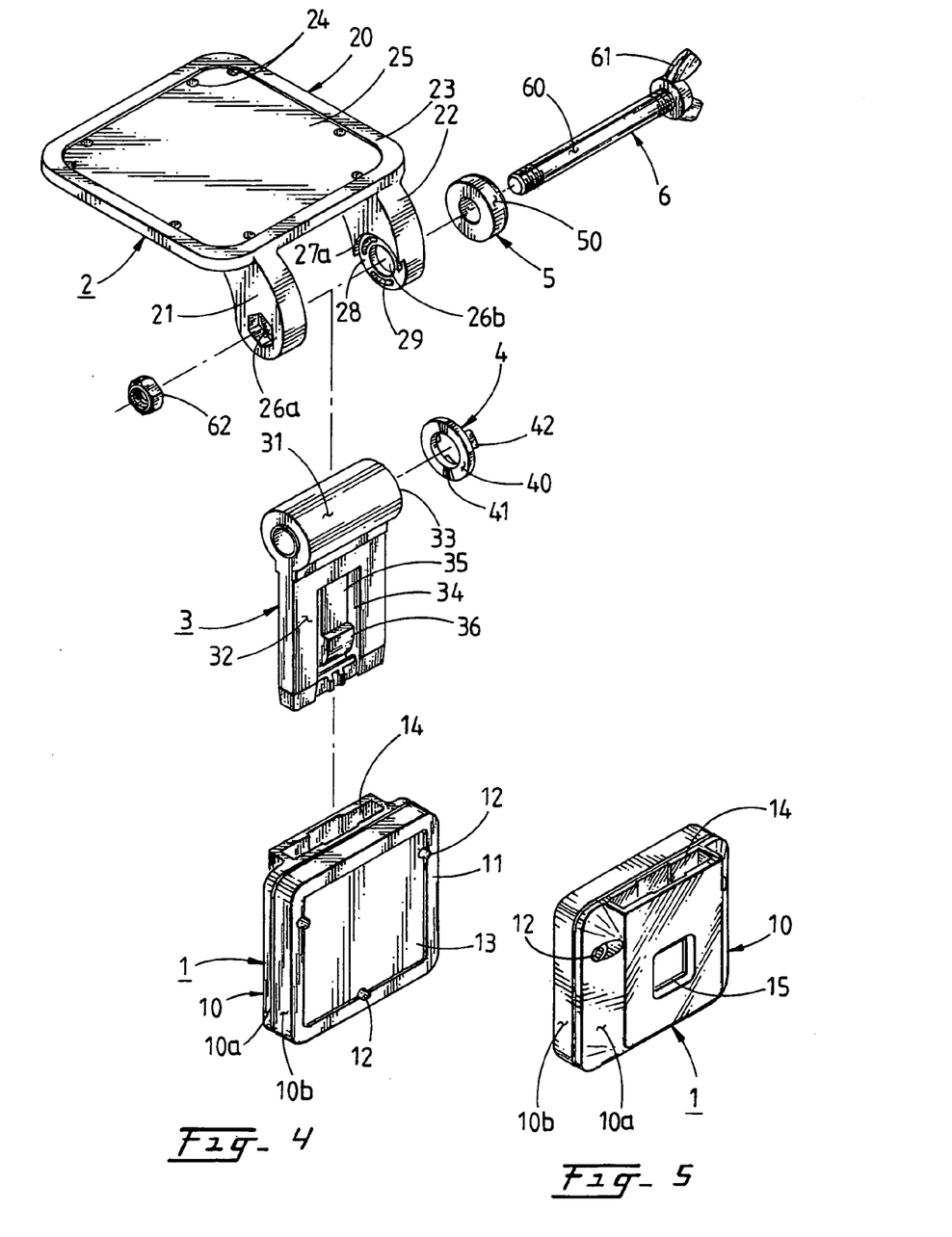
FIG. 4 is an exploded drawing of the automobile interior removable installation frame of the invention herein.
FIG. 5 is an isometric drawing of the automobile interior removable installation frame of the invention herein.
Figure 6:
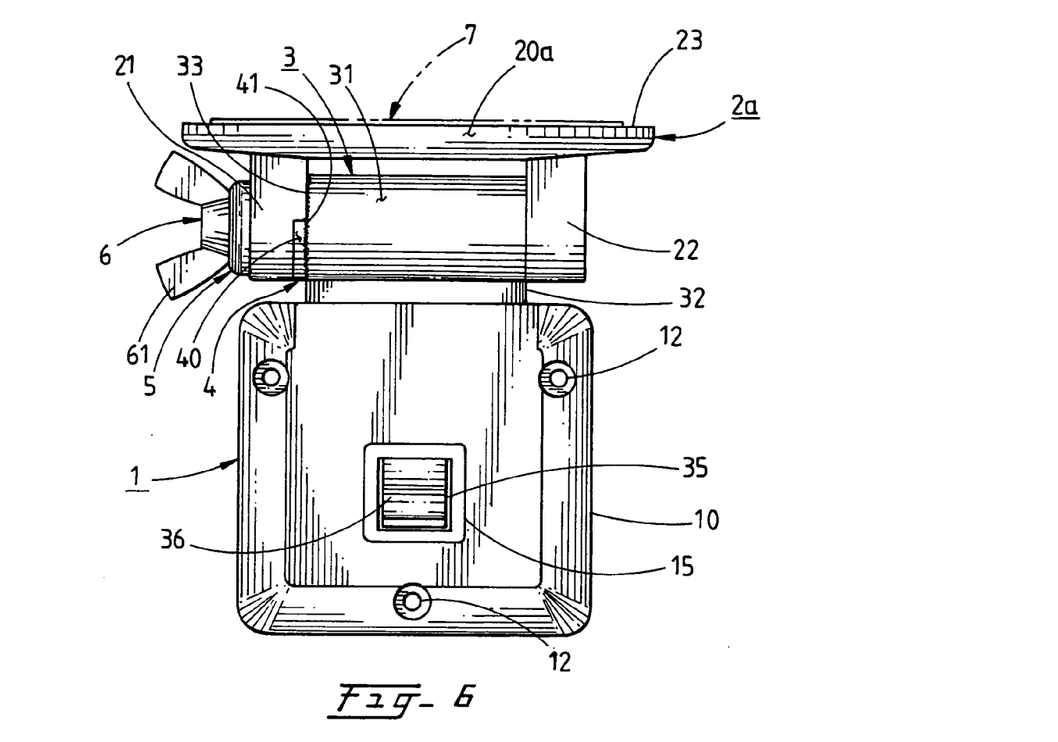
FIG. 6 is an orthographic drawing of another automobile interior removable installation frame embodiment of the invention herein, as viewed from the front surface.
Figure 7:
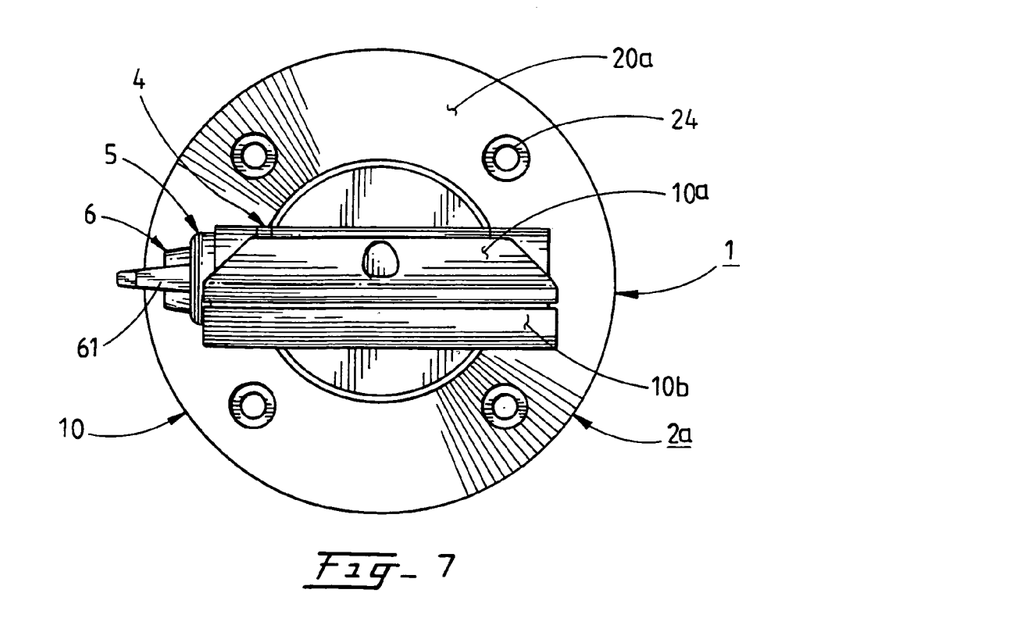
FIG. 7 is an orthographic drawing of the other automobile interior removable installation frame embodiment of the invention herein, as viewed from below.
Figure 8:
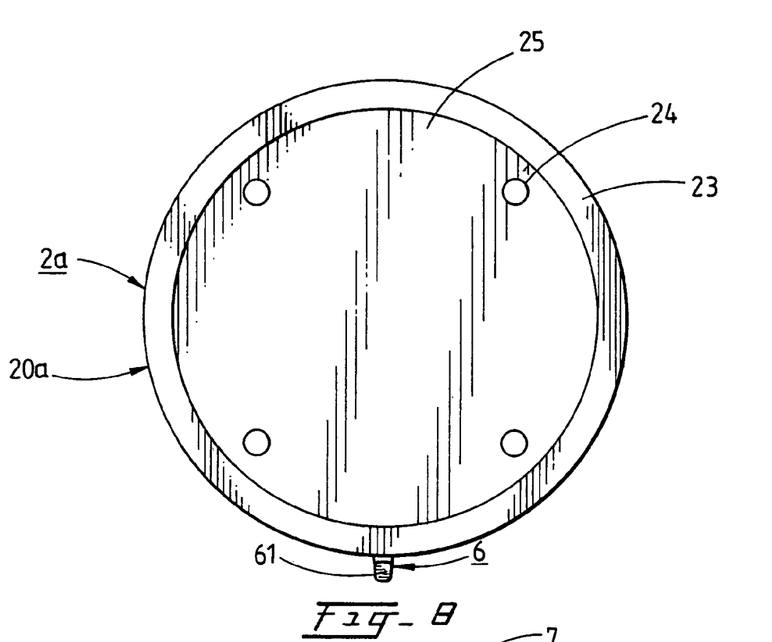
FIG. 8 is an orthographic drawing of the other automobile interior removable installation frame embodiment of the invention herein, as viewed from above.
Figure 9:
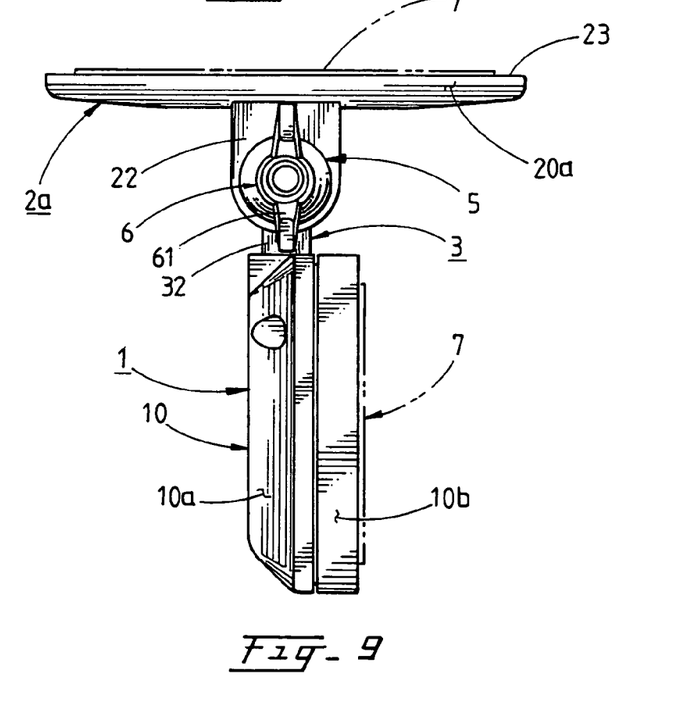
FIG. 9 is an orthographic drawing of the other automobile interior removable installation frame embodiment of the invention herein, as viewed from the right lateral surface.
Figures 10, 11:
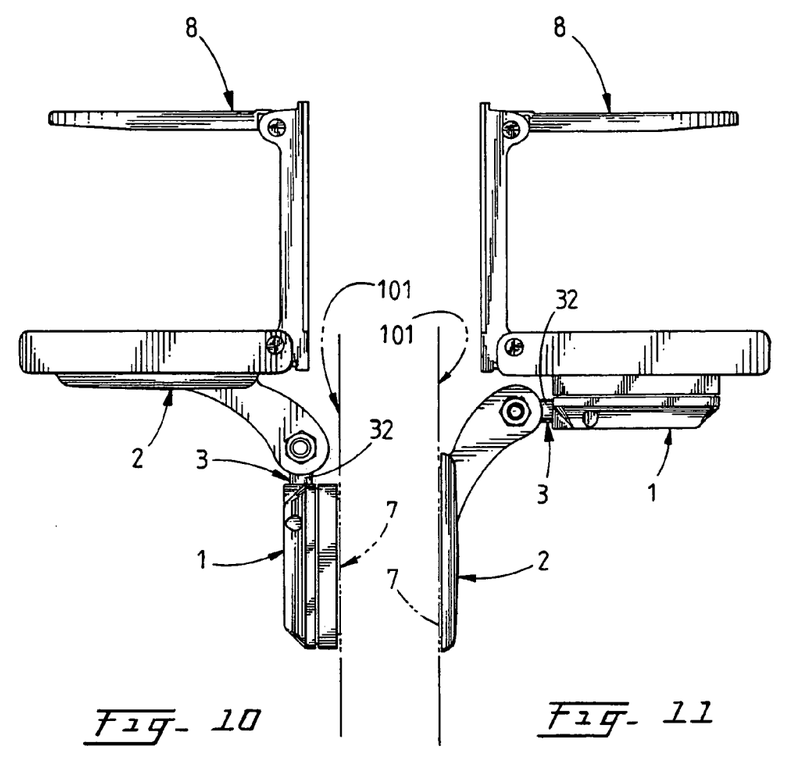
FIG. 10 is an orthographic drawing of the invention herein installed for usage on a vertical surface, as viewed from the right lateral surface.
FIG. 11 is an orthographic drawing of the invention herein differently installed for usage, as viewed from the left lateral surface.

As indicated in FIG. 1 and FIG. 2, the automobile interior removable installation frame of the invention herein is comprised of a mounting base 1, an accessory platform 2, a tang 3, a locating ring 4, a lock ring 5, and a fixing bolt 6. The form and arrangement of each structural component is shown in FIG. 4 and FIG. 5. Wherein, the mounting base 1 consists of a rectangular block 10 having a flat surface 11 along one side, with the block 10 having a minimum of two or more horizontally oriented holes 12 into which screws (not shown in the drawings) are inserted for fastening and installation to a suitable place in the interior of an automobile; the flat surface 11 has a shallow recess 13 with a square area of approximately 80 to 90 percent that of the flat surface 11 such that when the fastening and installation by means of screws is not possible, the shallow recess 13 accommodates the placement of a double-sided adhesive plate 7 that directly enables fastening and installation by means of adhesion at a suitable place in the interior of an automobile; along the lateral extent of the block 10, a rectangular tunnel 14 penetrates the inner portion of the block 10 and an opening 15 contiguous to the tunnel 14 is disposed in the lateral extent of the flat surface 11 (as shown in FIG. 5) that provides for the insertion of the tang 3 as well as facilitates its removal and detachment. The mounting base 1 is of molded plastic construction and, furthermore, to facilitate the forming of the rectangular tunnel 14, the opening 15, and the plurality of horizontally oriented holes 12, its block 10 is respectively fabricated of a front block 10a and a rear block 10b, and then fused into a single entity. The accessory platform 2 is also constructed of molded plastic into a rectangular planar body 20 having two projecting tabs 21 and 22 extending downward from one lateral edge which constitutes the platform body; the upper lateral plane of the planar body 20 consists of a flat surface 23 and, furthermore, a minimum of two or more passages or holes 24 disposed in the planar body 20 to admit screws (not shown in the drawings) for fastening and installing frequently utilized automobile interior accessories (such as a beverage holder 8, as shown in FIG. 10 and FIG. 11) onto the planar body 20, and the planar body 20 flat surface 23 has a shallow recess 25 with a square area of approximately 80 to 90 percent that of the flat surface 23 such that when the fastening and installation of the frequently utilized automobile interior accessories by means of screws is not possible, the shallow recess 25 accommodates the placement of a double-sided adhesive plate 7 that directly enables the fastening and installation of the frequently utilized automobile interior accessories by means of adhesion onto the planar body 20; the two projecting tabs 21 and 22 each consist of a common axial center, horizontally oriented hole 26a and 26b respectively disposed through them and, furthermore, a nut 62 is embedded in the outer side of the hole 26a in one projecting tab 21 and two receiving pits 27a and 27b (as shown in FIG. 3) are respectively formed along the inner and outer side of the hole 26b in the other projecting tab 22, and a minimum of two or more curved, horizontally oriented slots 29 are formed on a plate 28 between the two receiving pits 27a and 27b that enable the respective placement of the locating ring 4 and the lock ring 5 (as shown in FIG. 3) at the two receiving pits 27a and 27b. The tang 3 is similarly of molded plastic construction and consists of a transverse rod tube 31, a rectangular plate 32, the planar body of which extends from its lower end, and planar ratchets 33 (obscured by the transverse rod tube 31 and thus not viewable, but clearly observable in FIG. 2 and FIG. 6) are disposed at one end of the rod tube 31 that enmesh with the locating ring 4; an opening 34 is centrally disposed in the rectangular plate 32 and, furthermore, an elastic element 35 having a pawl 36 at the terminus of its two surfaces and which is contiguous to the upper edge of the opening 34 extends over the middle of the opening 34 with the lower end suspended such that when the rectangular plate 32 is inserted into the rectangular tunnel 14 of the mounting base 1 block 10, the pawl 36 on one surface of the elastic element 35 engages the opening 15 of the block 10 and is secured into position. The locating ring 4 is of molded plastic construction and formed into a washer-type annular body 40 having lateral ratchets 41 disposed on one surface that correspond to the planar ratchets 33 at one end of the tang 3 rod tube 31, thereby enabling enmeshment with it; curved projecting elements 42 emerge from the other surface which correspond to the horizontally oriented slots 29 on the plate 28 between the two receiving pits 27a and 27b, and the length of the curved projecting elements 42 is at minimum 0.5 mm or more longer than the thickness of the plate 28 between the two receiving pits 27a and 27b, thereby enabling the curved projecting element 42 to reach and extend into the outer side of the receiving pit 27b. The lock ring 5 is a liner tube-like annular body 50 of molded plastic construction or lathed construction that is nested in the receiving pit 27b at the outer side of the other accessory platform 2 projecting tab 22 such that it is against the curved projecting element 42 of the locating ring 4 and capable of pushing and thereby shifting the lock ring 5 inward, and causing the lateral ratchets 41 on it to firmly and stably enmesh the planar ratchets 33 on the tang 3 rod tube 31 (as shown in FIG. 3). The fixing bolt 6 is a threaded rod 60 having a wing nut 61 at one extremity that is fastened between the two projecting tabs 21 and 22 of the accessory platform 2 and utilized to secure the tang 3, the locating ring 4, and the lock ring 5 to the accessory platform 2 and thereby conjoin them into single structural entity.

To assemble the automobile interior removable installation frame of the invention herein, the locating ring 4 and lock ring 5 are first respectively nested in the receiving pits 27a and 27b at the inner and outer side of the other projecting tab 22 of the accessory platform 2, following which the tang 3 rod tube 31 is placed between the two projecting tabs 21 and 22, the fixing bolt 6 is then sequentially inserted through the lock ring 5, locating ring 4, and the tang 3 rod tube 31 from the outer side of the other projecting tab 22 and fastened into the nut 62 on the outer side of the accessory platform 2 projecting tab 21 (as shown in FIG. 3) to secure the tang 3 between the two projecting tabs 21 and 22 of the accessory platform 2, and finally the tang 3 rectangular plate 32 is inserted into the mounting base 1 rectangular tunnel 14, enabling the pawl 36 of the elastic element 35 on the rectangular plate 32 to engage and become positioned in the opening 15 on the lateral surface of the mounting base 1, thereby completing the assembly of the automobile interior removable installation frame of the invention herein, as indicated in FIG. 1 and FIG. 2.

Figure 12:
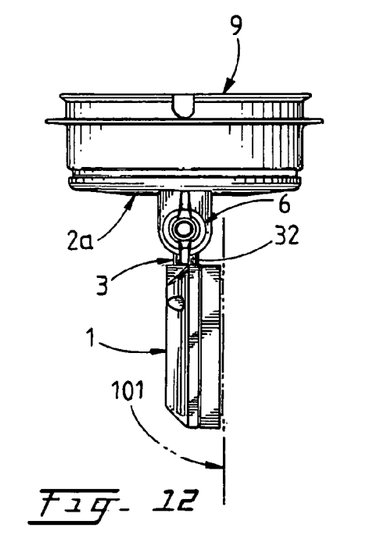
FIG. 12 is an orthographic drawing of the invention herein installed for usage on a vertical surface, as viewed from the right lateral surface
Figure 13:
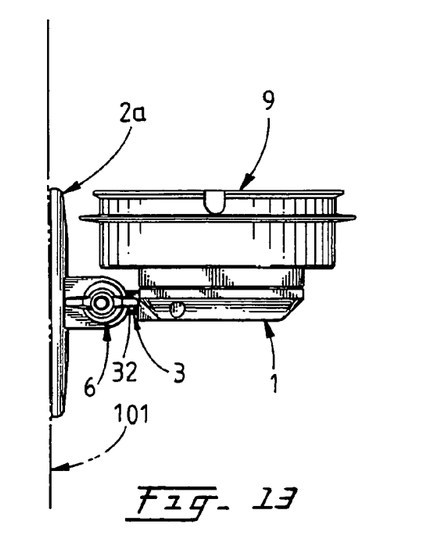
FIG. 13 is an orthographic drawing of the other embodiment of the invention herein differently installed for usage, as viewed from the left lateral surface.
Figure 14:
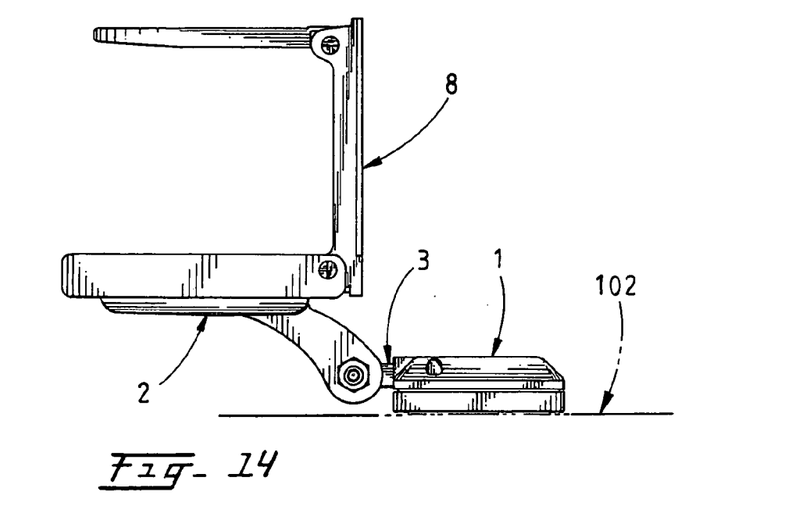
FIG. 14 is an orthographic drawing of the invention herein installed for usage on a horizontal surface, as viewed from the right lateral surface.
Figure 15:
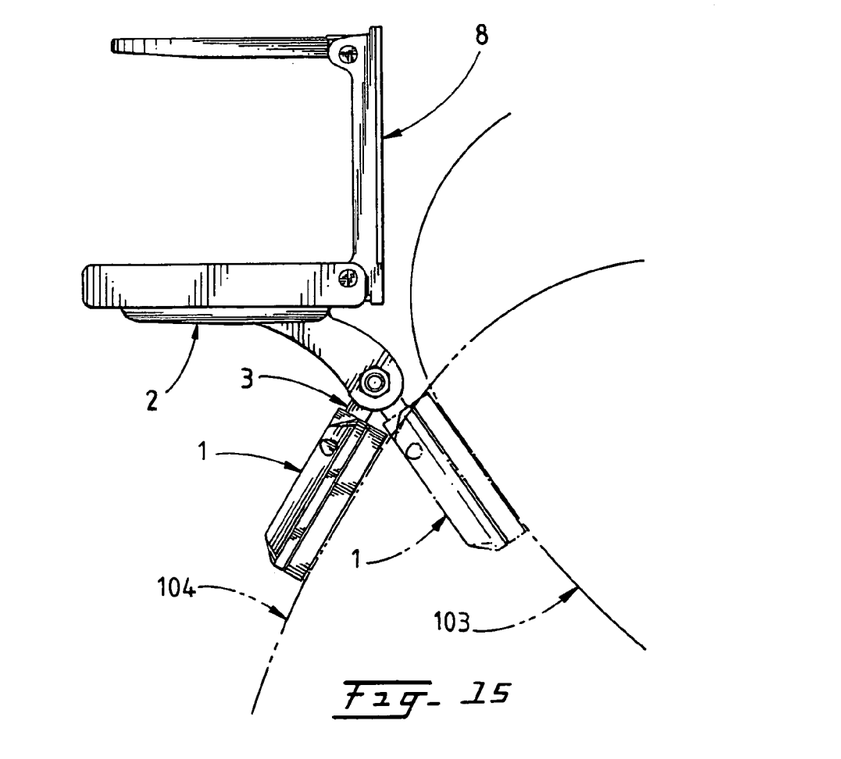
FIG. 15 is an orthographic drawing of the invention herein installed for usage on a small inwardly or outwardly inclined flat surface, as viewed from the right lateral surface.

When the automobile interior removable installation frame of the invention herein is installed, one finger (typically the thumb or the index finger) must be utilized to press down the elastic element 35 at the center of the tang 3 rectangular plate 32 through the mounting base 1 opening 15 area, thereby releasing the pawl 36 from engagement with the upper edge of the opening 15 and allowing the detachment of the mounting base 1 for fastening it by means of screws (not shown in the drawings) or the double-sided adhesive plate 7 onto a vertical surface 101 or a horizontal surface 102 (as shown in FIG. 10 and FIG. 14) or on a small inwardly inclined flat surface 103 or a small outwardly inclined surface 104 (as shown in FIG. 15) at a suitable place in the interior of an automobile; next, comes the attachment of the frequently utilized accessory such as a beverage holder 8 (as shown in FIG. 10, FIG. 14, and FIG. 15), an ashtray 9 (as shown in FIG. 12 and FIG. 13), a scenting agent, LCD screen, or other accessory which is screw fastened or adhesively bonded to the accessory platform 2 planar body 20; and following the attachment, the tang 3 on the accessory platform 2 is inserted into the rectangular tunnel 14 on the mounting base 1 block 10 and therein positioned to complete the installation, the installation tasks of which are quite simple and rapid; it is only necessary to manually loosen the fixing bolt 6 to simply and rapidly adjust the forward or rearward angle of the installed beverage holder 8, ashtray 9, or other frequently utilized automobile interior accessory. When the automobile is not used and the occupants have disembarked, the owner or user can detach the accessory platform 2 and tang 3 along with the installed frequently utilized automobile interior accessory for removal and storage or carry it outside the automobile to prevent theft of articles left inside the vehicle.

Referring to FIG. 6, FIG. 7, FIG. 8, and FIG. 9, the shape of the accessory platform 2 of the automobile interior removable installation frame of the invention herein matches the external shape of the installed accessory. When screw fastening or adhesively bonding and thereby installing a round or oval, polygonal, or other geometrically circular ashtray 9 (as shown in FIG. 12), the accessory platform 2a is a circular planar body 20a or an oval, polygonal, or other geometrically rounded planar body, whose lower side has downward extending two projecting tabs 21 and 22 constituting the base entity that enables the positioning and installation of the round, oval, polygonal, or geometrically circular ashtray 9 or other automobile interior frequently utilized accessory and, furthermore, there is a harmonious overall appearance after installing the ashtray 9 or other frequently utilized automobile interior accessory on the automobile interior removable installation frame of the invention herein; additionally, the installation, positioning, and adjustment method of other sections constituting the arrangement is completely the same for all the embodiments and thus no further elaboration is provided. As a result, during production, the accessory platform 2a circular planar body 20a or the oval, polygonal, or other geometrically rounded planar body is molded as a single structural entity to save much of the molding and fitting costs.

Referring to FIG. 11 and FIG. 13, in addition to the above approach to the assembly of the automobile interior removable installation frame of the invention herein, wherein the mounting base 1 is positioned and installed at a suitable place in the interior of an automobile, and after the beverage holder 8, ashtray 9, or other frequently utilized vehicle interior accessory is positioned and installed on the surface of the accessory platform 2 or 2a rectangular planar body 20 or circular planar body 20a, the tang 3 on it is inserted into the mounting base 1, the present invention can be modified such that the accessory platform 2 or 2a planar body 20 or 20a is screw fastened or adhesively bonded in the automobile interior and after changing the positioning and installation of the frequently utilized accessory such as the beverage holder 8 or the ashtray 9 on the mounting base 1, then the tang 3 on the accessory platform 2 or 2a is integrated with the mounting base 1, thereby completing the assemblage. If the owner leaves the vehicle, the frequently utilized automobile interior accessory attached to the mounting base 1 is detachable from the accessory platform 2 or 2a for removal and storage or carrying outside the automobile.

The invention claimed is:

1. An automobile interior removable installation frame comprised of:
   a mounting base disposed as a rectangular block that comprises:
   a flat surface along one side of said block;
   a minimum of two or more horizontally oriented holes in said block;
   a rectangular tunnel that is disposed along the lateral extent of said block and penetrates the inner portion of said block;
   an opening that is disposed in the lateral extent of said flat surface and contiguous to said tunnel;
   an accessory platform comprising:
   a rectangular planar body;
   two projecting tabs extending downward respectively from one lateral edge of said planar body;
   a minimum of two or more passages or holes disposed in said planar body;
   a coaxial, horizontally oriented hole disposed through each of said two projecting tabs;
   a nut embedded in the outer side of the hole in one of said projecting tabs;
   two receiving pits respectively formed along the inner and outer side of said hole in the other of said projecting tabs;
   two or more curved, horizontally oriented slots formed on a plate between said two receiving pits;
   a tang comprising:
   a transverse rod tube;
   a rectangular plate having a planar body extending from the lower end of said transverse rod tube;
   planar ratchets disposed at one end of said rod tube;
   an opening centrally disposed in the planar body of said rectangular plate;
   an elastic element having a pawl at the terminus of its two surfaces and that is disposed at the middle of said opening;
   a locating ring formed into a washer-type annular body comprising:
   lateral ratchets disposed on one surface;
   curved projecting elements disposed one the other surface;
   a lock ring consisting of a liner tube-like annular body;
   a fixing bolt consisting of a threaded rod and a wing nut at one extremity;
   wherein said locating ring and said lock ring are first respectively nested in said receiving pits at the inner and outer side of said other projecting tab of said accessory platform, following which said rod tube is placed between said two projecting tabs; and said fixing bolt is sequentially inserted through said lock ring, said locating ring, and said rod tube from the outer side of said other projecting tab and fastened into said nut on the outer side in one of said projecting tab to secure said tang between said two projecting tabs of said accessory platform, such that said rectangular plate of said tang is directly inserted into said rectangular tunnel, enabling engagement and positioning of said pawl on said elastic element in said opening of said mounting base, thereby completing the assembly of the automobile interior removable installation frame of the invention herein.

2. The automobile interior removable installation frame of the invention of claim 1 wherein said accessory platform includes a circular planar body and said two projecting tabs extending downward to constitute the base entity.

3. The automobile interior removable installation frame of the invention of claim 1 wherein said accessory platform planar body includes that having polygonal, oval, and other geometrically rounded shapes.

4. The automobile interior removable installation frame of the invention of claim 1 wherein the assemblage of the present invention can be modified such that said rectangular planar body of said accessory platform is positioned and installed at a suitable place in the interior of an automobile by screws or twin adhesive and a frequently utilized accessory is fixed onto said mounting base and then the tang on said accessory platform is integrated with said mounting base to complete the installation and usage procedure.

5. The automobile interior removable installation frame of the invention of claim 1 wherein said planar body of said accessory platform can be disposed with an installed accessory as a single entity.

6. The automobile interior removable installation frame of the invention of claim 1 wherein said lateral ratchets disposed on one surface of said locating ring are capable of corresponding enmeshment with said planar ratchets on the rod tube of said tang.

7. The automobile interior removable installation frame of the invention of claim 1 wherein said curved projecting elements disposed on the other surface of said locating ring correspond to said curved, horizontally oriented slots on said plate between said two receiving pits on said other projecting tab of said accessory platform, and the length of said curved projecting elements is longer than the thickness of said plate between said two receiving pits.

* * * * *